June 26, 1928.

H. W. PLEISTER ET AL

METHOD OF MANUFACTURING NAIL EXPANSION SHIELDS

Original Filed April 8, 1927   3 Sheets-Sheet 1

1,674,661

Henry W Pleister
John Kautzky
INVENTORS

BY Alan M Johnson
ATTORNEY.

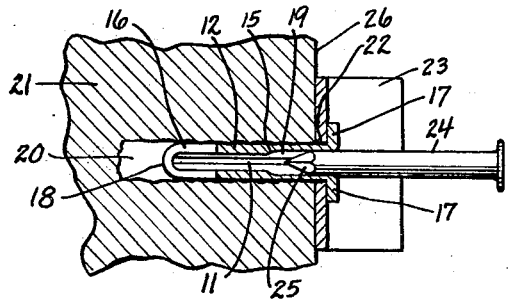
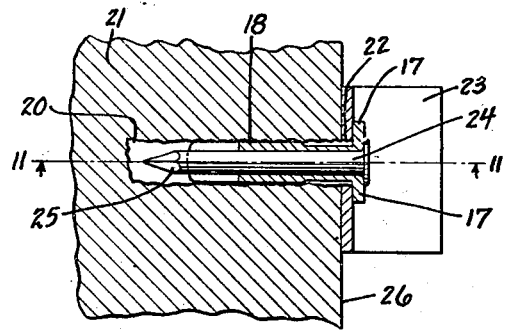
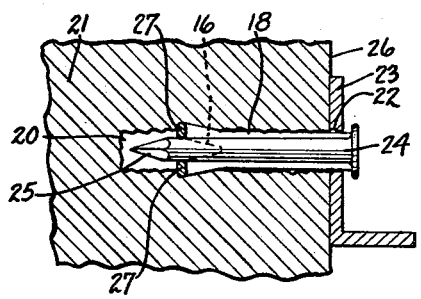
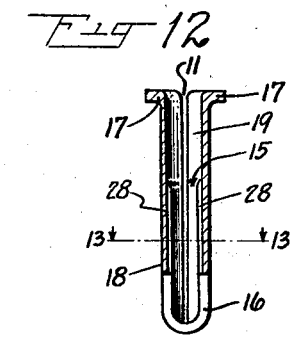
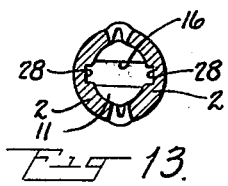

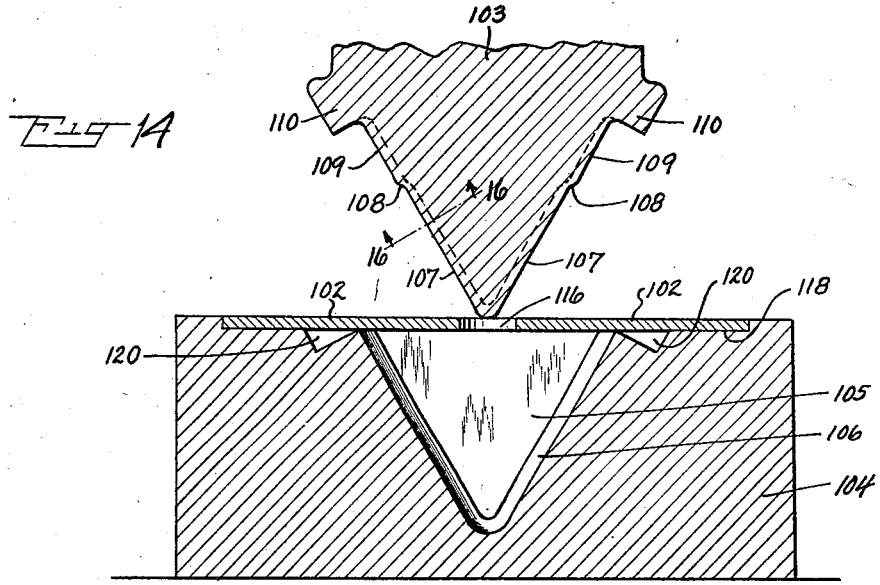

Patented June 26, 1928.

1,674,661

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL CORPORATION, OF GARWOOD, NEW JERSEY, A CORPORATION OF NEW JERSEY.

METHOD OF MANUFACTURING NAIL-EXPANSION SHIELDS.

Original application filed April 8, 1927, Serial No. 182,072. Divided and this application filed October 6, 1927. Serial No. 224,408.

This application is a division of our copending application Ser. No. 182,072, filed April 8, 1927.

Our invention covers the method and apparatus for manufacturing nail expansions from strips of sheet metal whereby the expansions are provided with an enlarged open throat, to insure that the entering nail will not expand the sheet metal nail fastener until it has progressed a predetermined distance along the axial bore, the distance being sufficient to prevent any substantial expansion of the sides of the shield adjacent to the wall of the support; thereby avoiding cracking or marring the wall adjacent the hole.

Our invention further relates to certain methods, articles of manufacture, combinations and sub-combinations, and details of construction, all of which will be more fully hereinafter described and pointed out in the claims.

In the drawings we have shown different embodiments of our invention, but it is, of course, to be understood that our invention is not to be confined to these particular embodiments shown by way of illustration.

Fig. 9 is a horizontal section through a support, and a shield, the shield about to be expanded;

Fig. 10 is a horizontal section, similar to Fig. 9, showing the nail completely driven into the shield which is expanded;

Fig. 11 is a vertical section, on the line 10—10, of Fig. 10;

Fig. 12 is a vertical section through a modified form of sheet metal shield, provided with longitudinally extending grooves;

Fig. 13 is a horizontal section on the line 13—13 of Fig. 12;

Fig. 14 is a diagrammatic vertical section of a modification showing the preferred form of dies employed;

Fig. 15 is a diagrammatic vertical section showing the dies of Fig. 14 about to compress the sheet metal blank;

Fig. 16 is a vertical section on the line 16—16 of Fig. 14.

Figure 1:
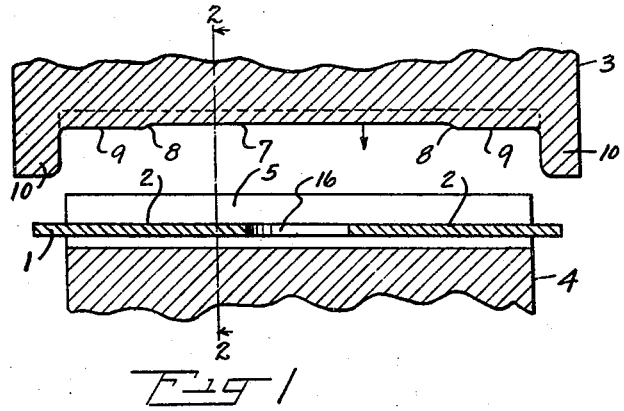
Fig. 1 is a diagrammatic vertical section showing dies about to compress a sheet metal blank.

When the support in which the sheet metal shield is expanded, is of more or less friable material, or material which will crack or chip around the opening in which the shield is mounted, the surface of the support will be marred resulting in a poor and unworkmanlike job, unless an escutcheon or a similar plate is used to hide the marred face of the support. Such plates, of course, are an additional expense and, in some locations, it is not feasible to use them.

By our invention we form a very cheap sheet metal shield, to be expanded by a nail or similar expanding member, which can be expanded in a support without cracking or marring the surface adjacent the hole. It is, therefore, clear that by our invention a neat workmanlike job is obtained without employing an escutcheon plate, or any other member for no cracks or chips will be formed around or adjacent the hole in the support.

We cut off a blank 1 from a bar, strip, or sheet of zinc, soft steel, aluminum, brass, lead, or in fact any suitable metal which can be worked and bent. This blank 1, is worked in any suitable manner, so that the sides 2—2 of the blank will be formed of metal of different thicknesses. This may be done in various ways as by a hammer and other proper tools, or it may be done between an upper die 3 and a lower die 4, Fig. 1. The lower die 4 is provided with a recess 5 of the same width as the width of the blank 1, the lower portion 6 of the groove 5 being rounded.

The upper die 3 is provided with a main convex surface 7, tapering at 8—8 to form supplemental die surfaces 9—9, in a different plane from the main surface 7. The ends of the die 3 are provided with arms 10—10.

Figure 2:
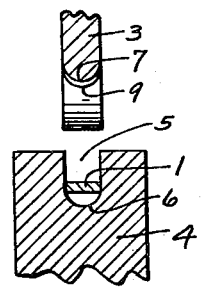
Fig. 2 is a transverse vertical section on the line 2—2 of Fig. 1, looking in the direction of the arrows.
Figure 5:
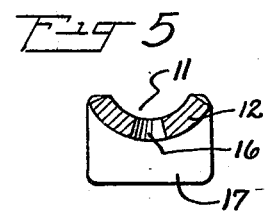
Fig. 5 is a transverse vertical section, on an enlarged scale, on the line 5—5 of Fig. 4.

When the blank 1 is in the position shown in Figs. 1 and 2, and pressure is exerted upon the blank by moving one or both of the dies towards each other, it will be clear that as the main convex surface 7 and the supplemental convex surfaces 9—9 are brought to bear upon the blank 1, the blank will be arched or bent as shown in Fig. 5, forming one-half of an axial bore 11. At the same time excessive pressure will be exerted upon the portions 12—12 of the sides 2—2, due to the fact that the convex surfaces 9—9 are raised above the level of the convex surface 7. This causes the metal in the ends 12—12 of the blank 1 to flow, or be displaced, as shown by the dotted lines 14—14 in Figs. 4 and 6. The inclined surfaces 15—15 will be formed on the blank 1 due to the action of the inclined convex surfaces 8—8 in the upper die 3.

Figure 3:
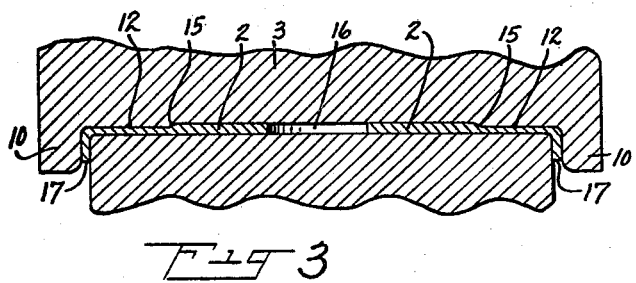
Fig. 3 is a vertical section, similar to Fig. 1, illustrating the action of the dies upon the blank.

As we have illustrated our invention, the blank 1 is provided with a slot or weakening portion 16 before it is placed within the dies, though such a slot may be formed by the dies if desired. At the same time that a portion of the ends 12—12 of the blank are being pressed or swaged to make them thinner, the arms 10—10 of the upper die 3 bend the very ends 12—12 of the blank, forming the flanges or stops 17—17, as shown in Fig. 3.

Figure 4:
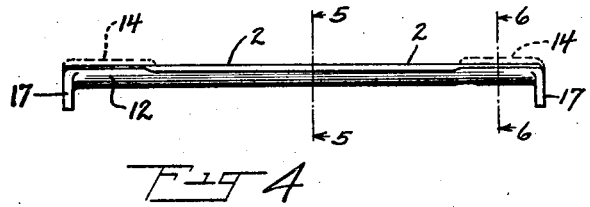
Fig. 4 is a side elevation of the shaped blank after being removed from the dies shown in Fig. 3.
Figure 6:
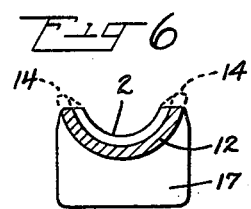
Fig. 6 is a transverse vertical section, on an enlarged scale, on the line 6—6 of Fig. 4.

After the blank is removed from the die, it will be semi-cylindrical in cross section, as shown in Fig. 4. Preferably, though not necessarily, the surplus or displaced metal 14—14 is removed from the thin sides 12—12 of the blank prior to bending it, as shown in Figs. 4 and 6, though this surplus metal may be left on the blank if desired. The blank is then bent midway of its length to form the complete sheet metal shield 18, Fig. 7, having the axial bore 11, a portion of the bore being enlarged to form an open throat 19.

In use the sheet metal shield 18 is mounted in a hole 20, drilled or otherwise formed in any support 21, the shield being preferably passed through a hole 22 in the work 23, until the flanges or stops 17—17 are brought up flush against the work. A nail 24 is then inserted in the open throat 19 of the axial bore 11, but due to some of the metal having been displaced, the axial bore at this point will be substantially the diameter of the nail, so that there will be no expansion of the sides of the shield 18 until the end 25 of the nail reaches the inclined surfaces 15—15 of the axial bore. After passing these inclined surfaces, the two sides 2—2 will be wedged apart to form a firm bond or grip with the interior surface of the hole 20. No expansive strains or stresses, however, will be thrown on the surface 26, adjacent the hole, for the reason that the sheet metal expansion shield does not begin to expand until the end 25 of the nail reaches the inclined surfaces 15—15 which are well within the hole, and removed from the surface 26. Consequently there will be no cracking or marring of the surface, (see Fig. 10).

The expansion, which has just been described, is what is known in this case as a primary expansion. As the end 25 of the nail passes into and through the slot 16 at the bent end of the sheet metal shield 18, the bent portions or arms 27—27, (see Figs. 8 and 11) are wedged apart in a direction 90° from the primary expansion, previously referred to, thereby forming a secondary expansion, and greatly increasing the bond or hold of the shield in the wall or support.

We have shown a modification of our invention in Figs. 12 and 13, in which the sides 2—2 of the shield are provided with longitudinally extending grooves 28—28 extending from the inclined surface 15 to the slot 16. These grooves assist in the expansion of the metal of the shield, permitting it to be more readily forced into any minute or other voids or irregularities in the surface of the hole 20.

In Figs. 14, 15 and 16 we have illustrated the preferred method of manufacturing the nail expansion or shield.

In this form of our invention the blank 1, is in all respects the same as the blank in the other figures. The upper die 103 and the lower die 104 are V-shaped so as not only to swage or compress the metal of the blank to form the sides 102, 102 of different thicknesses of metal, but at the same time to give the shield or nail expansion approximately its final form.

The blank 102 is positioned in the recess 118 in the lower die 104, Fig. 14. This recess 118 acts as a gauge for the blank. The blank may have been provided with the slot 116, or otherwise weakened at this point, as pointed out in the preceding portion of this specification. The lower die is provided with the V-shaped concave depression 105 provided with a rounded portion 106 which curves the blank and makes it semi-cylindrical. The upper die 103 is V-shaped and adapted to fit into and co-operate with the lower die 104. The exterior surface of this upper die comprises a main convex surface 107, 107 tapering at 108, 108, to form supplemental die surfaces 109, 109 in a different plane from the main die surfaces 107, 107, Figs. 14 and 15.

When the blank is in the position shown in Fig. 14 and pressure is exerted upon the blank 1 by moving one or both of the dies 103 and 104 towards each other, it will be clear that as the main V-shaped convex die surfaces 107—107 are brought to bear on the blank, the blank will be bent in the middle and, while so bent, forced into the V-shaped cavity 105 of the lower die 104.

This will shorten the blank, bringing its ends in line with the shelves 120—120 formed on the lower die 104. Further downward movement of the upper die 103, for example, will make the blank 1 conform to the contour of the V-shaped recess 105 and at the same time curve or round the blank so that each side 102—102 will be semi-cylindrical in cross section.

When the surfaces 108—108, and 109—109 are forced into contact with the blank 1 they will swage or cause the metal of the blank to flow so that the sides 102—102 of the shield or nail expansion will be of different thicknesses, as shown at 121—121, where the metal is substantially the thickness of the blank 1; and at 122—122 where the metal is thinner than at 121—121, thereby forming the open throat in the complete shield or nail expansion as described in connection with the other figures.

Before the final movement of the dies, the shoulders 110—110 on the upper die 103 engage with the ends of the blank and bend them outward as shown in Fig. 15, the ends of the blank being pressed onto the shelves 120—120 and forming the flanges or stops 123—123, Fig. 15, of the completed shield or nail expansion.

Figures 7, 8:
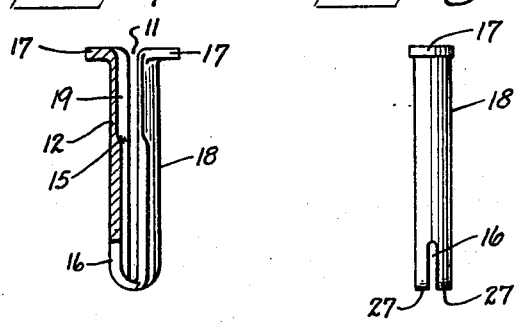
Fig. 7 is a side elevation, partly broken away, to show the interior construction of the complete finished sheet metal shield.
Fig. 8 is a front elevation, taken 90° from the position shown in Fig. 7.

On withdrawing the upper die 103 the completely formed shield or nail expansion can be removed from the lower die, and will only require slight bending of the sides, towards each other, to form the completed article as illustrated in Figs. 7 and 8.

Having thus described our invention in connection with different illustrative embodiments thereof, the details of which we do not desire to be limited, what is claimed as new and what is desired to secure by Letters Patent, is set forth in the appended claims.

What we claim is:—

1. The method of manufacturing an integral nail expansion shield, consisting in cutting a strip of sheet metal of the required length to form a shield blank, swaging or pressing the ends of the blank to reduce the thickness of the metal on the ends, and bending the blank midway of its length to form a shield having two integral sides of different thicknesses and an axial bore with an open throat.

2. The method of manufacturing an integral nail expansion shield, consisting in cutting a strip of sheet metal of the required length to form a shield blank, swaging or pressing the ends of the blank to reduce the thickness of the metal on the ends, arching the blank, and bending the blank midway of its length to form a shield having two integral sides of varying thicknesses throughout their length, and an axial bore with an open throat.

3. The method of manufacturing an integral nail expansion shield, consisting in cutting a strip of sheet metal of the required length to form a shield blank, swaging or pressing the ends of the blank to reduce the thickness of the metal on the ends, removing the surplus metal, and bending the blank midway of its length to form a shield having two integral sides of varying thicknesses and an axial bore with an open throat.

4. The method of manufacturing an integral nail expansion shield, consisting in cutting a strip of sheet metal of the required length to form a shield blank, swaging or pressing the ends of the blank to reduce the thickness of the metal on the ends, arching the blank, removing the surplus metal, and bending the blank midway of its length to form a shield having two integral sides of different thicknesses and an axial bore with an open throat.

5. The method of manufacturing at one operation an integral nail expansion shield, consisting in cutting a strip of sheet metal of the required length to form a shield blank, bending the blank at one operation into a V-shaped member and swaging or pressing the sides of the V-shaped member to reduce the thickness of the metal on the sides to form an open throat.

6. The method of manufacturing at one operation an integral nail expansion shield, consisting in cutting a strip of sheet metal of the required length to form a shield blank, bending the blank at one operation into a V-shaped member and swaging or pressing the sides of the V-shaped member to reduce the thickness of the metal on the sides to form an open throat, and at the same time bending the ends of the V-shaped member to form flanges or stops.

7. The method of manufacturing at one operation an integral nail expansion shield, consisting in cutting a strip of sheet metal of the required length to form a shield blank, bending the blank at one operation into a V-shaped member and swaging or pressing the sides of the V-shaped member to reduce the thickness of the metal on the sides to form an open throat, and curving the blank to form semi-cylindrical sides.

8. The method of manufacturing at one operation an integral nail expansion shield, consisting in cutting a strip of sheet metal of the required length to form a shield blank, bending the blank at one operation into a V-shaped member and swaging or pressing the sides of the V-shaped member to reduce the thickness of the metal on the sides to form an open throat, and curving the blank to form semi-cylindrical sides, and at the same time bending the ends of the V-shaped member to form flanges or stops.

9. The method of manufacturing an integral nail expansion shield from metal of uniform thickness, consisting in cutting a strip of sheet metal of the required length to form a shield blank, swaging or pressing the ends of the blank to reduce the thickness of the metal on the ends, and bending the blank midway of its length to form a shield having two integral sides of different thicknesses and an axial bore with an open throat.

10. The method of manufacturing an integral nail expansion shield from metal of uniform thickness, consisting in cutting a strip of sheet metal of the required length to form a shield blank, swaging or pressing the ends of the blank to reduce the thickness of the metal on the ends, arching the blank, and bending the blank midway of its length to form a shield having two integral sides of varying thicknesses throughout their length, and an axial bore with an open throat.

11. The method of manufacturing an integral nail expansion shield from metal of uniform thickness, consisting in cutting a strip of sheet metal of the required length to form a shield blank, swaging or pressing the ends of the blank to reduce the thickness of the metal on the ends, removing the surplus metal, and bending the blank midway of its length to form a shield having two integral sides of varying thicknesses and an axial bore with an open throat.

12. The method of manufacturing an integral nail expansion shield from metal of uniform thickness, consisting in cutting a strip of sheet metal of the required length to form a shield blank, swaging or pressing the ends of the blank to reduce the thickness of the metal on the ends, arching the blank, removing the surplus metal, and bending the blank midway of its length to form a shield having two integral sides of different thicknesses and an axial bore with an open throat.

13. The method of manufacturing at one operation an integral nail expansion shield from metal of uniform thickness, consisting in cutting a strip of sheet metal of the required length to form a shield blank, bending the blank at one operation into a V-shaped member and swaging or pressing the sides of the V-shaped member to reduce the thickness of the metal on the sides to form an open throat.

14. The method of manufacturing at one operation an integral nail expansion shield from metal of uniform thickness, consisting in cutting a strip of sheet metal of the required length to form a shield blank, bending the blank at one operation into a V-shaped member and swaging or pressing the sides of the V-shaped member to reduce the thickness of the metal on the sides to form an open throat, and at the same time bending the ends of the V-shaped member to form flanges or stops.

15. The method of manufacturing at one operation an integral nail expansion shield from metal of uniform thickness, consisting in cutting a strip of sheet metal of the required length to form a shield blank, bending the blank at one operation into a V-shaped member and swaging or pressing the sides of the V-shaped member to reduce the thickness of the metal on the sides to form an open throat, and curving the blank to form semi-cylindrical sides.

16. The method of manufacturing at one operation an integral nail expansion shield from metal of uniform thickness, consisting in cutting a strip of sheet metal of the required length to form a shield blank, bending the blank at one operation into a V-shaped member and swaging or pressing the sides of the V-shaped member to reduce the thickness of the metal on the sides to form an open throat, and curving the blank to form semi-cylindrical sides, and at the same time bending the ends of the V-shaped member to form flanges or stops.

HENRY W. PLEISTER.
JOHN KARITZKY.